US012522801B2

(12) United States Patent
Shu et al.

(10) Patent No.: US 12,522,801 B2
(45) Date of Patent: Jan. 13, 2026

(54) SALT-TOLERANT HETEROTROPHIC NITRIFICATION AEROBIC DENITRIFICATION PHOSPHORUS REMOVAL BACTERIAL STRAIN AND APPLICATION THEREOF

(71) Applicant: Guangzhou University, Guangzhou (CN)

(72) Inventors: Hu Shu, Guangzhou (CN); Yonghao Ma, Guangzhou (CN); Wen Huang, Guangzhou (CN); Chong Han, Guangzhou (CN)

(73) Assignee: Guangzhou University, Guangzhou (CN)

( * ) Notice: Subject to any disclaimer, the term of this patent is extended or adjusted under 35 U.S.C. 154(b) by 0 days.

(21) Appl. No.: 18/535,656

(22) Filed: Dec. 11, 2023

(65) Prior Publication Data

US 2024/0191178 A1    Jun. 13, 2024

(30) Foreign Application Priority Data

Dec. 13, 2022   (CN) .......................... 202211592856.3

(51) Int. Cl.
*C12N 1/20* (2006.01)
*C02F 3/30* (2023.01)
(Continued)

(52) U.S. Cl.
CPC .............. *C12N 1/205* (2021.05); *C02F 3/305* (2013.01); *C02F 3/308* (2013.01); *C02F 3/34* (2013.01);
(Continued)

(58) Field of Classification Search
CPC . C12N 1/205; C12N 1/20; C02F 3/305; C02F 3/308; C02F 3/34; C02F 3/341;
(Continued)

(56) References Cited

U.S. PATENT DOCUMENTS

| 6,830,899 B1 | 12/2004 | Chen et al. |
| 2005/0009151 A1 | 1/2005 | Chase et al. |
| 2006/0063237 A1 | 3/2006 | Gimmestad et al. |

FOREIGN PATENT DOCUMENTS

| CN | 101787353 A | 7/2010 |
| CN | 101812416 A | 8/2010 |

(Continued)

OTHER PUBLICATIONS

Machine-generated English translation of KR 20130108763, generated on Feb. 4, 2025.*

(Continued)

*Primary Examiner* — Fred Prince
(74) *Attorney, Agent, or Firm* — Zhigang Ma

(57) ABSTRACT

The application relates to the field of microbiology and presents a salt-tolerant heterotrophic nitrification aerobic denitrifying and phosphorus removal bacterial strain and its application. The strain is *Pseudomonas mendocina* A4, deposited on Nov. 4, 2022, at the Guangdong Microbial Culture Collection Center, located at Building 59, 5th Floor, No. 100 Xianlie Middle Road, Yuexiu District, Guangzhou, Guangdong Province, with the deposit number GDMCC No: 62944. The *Pseudomonas mendocina* A4 strain provided by the present application possesses both heterotrophic nitrification and aerobic denitrification functions and can be applied in the field of wastewater treatment. It has a strong tolerance to high concentrations of organic carbon while utilizing various organic carbon sources in wastewater and exhibits excellent organic carbon removal capabilities in water. This strain is particularly suitable for treating nitrogen-containing wastewater with a high C/N ratio.

9 Claims, 7 Drawing Sheets

Specification includes a Sequence Listing.

(51) Int. Cl.
*C02F 3/34* (2023.01)
*C02F 101/10* (2006.01)
*C02F 101/16* (2006.01)
*C12R 1/38* (2006.01)

(52) U.S. Cl.
CPC ............... C02F 3/341 (2013.01); C12N 1/20 (2013.01); *C02F 2101/105* (2013.01); *C02F 2101/163* (2013.01); *C02F 2101/166* (2013.01); *C02F 2305/06* (2013.01); *C12R 2001/38* (2021.05); *Y02W 10/10* (2015.05)

(58) Field of Classification Search
CPC .......... C02F 2101/105; C02F 2101/163; C02F 2101/166; C02F 2305/06; C12R 2001/38; Y02W 10/10
USPC .................. 210/610, 611, 620, 903, 906
See application file for complete search history.

(56) References Cited

FOREIGN PATENT DOCUMENTS

| | | | | |
|---|---|---|---|---|
| CN | 113604379 | A | | 11/2011 |
| CN | 103484398 | A | | 1/2014 |
| CN | 105861359 | A | | 8/2016 |
| CN | 106520624 | A | | 3/2017 |
| CN | 109880762 | A | * | 6/2019 ............... C12N 1/20 |
| CN | 111977800 | A | | 11/2020 |
| CN | 113174345 | A | | 7/2021 |
| CN | 113699057 | A | | 11/2021 |
| CN | 114381402 | A | | 4/2022 |
| KR | 20130108763 | A | * | 10/2013 |
| SU | 1640155 | A1 | | 4/1991 |
| WO | 2008141523 | A1 | | 11/2008 |

OTHER PUBLICATIONS

Machine-generated English translation of CN 109880762, generated on Jul. 19, 2025.*

李静等，- 株石化废水中脱氮产微生物絮凝剂菌株的鉴定与性能，安全与环境学报，Jun. 25, 2017，第17卷，第3期，P1117-1124，中国（Li Jing et al, Identification and characterization of a nitrogen removal bacterial strain with the flocculate capability in the oil-refinery sewage, Journal of Safety and Environment, Jun. 25, 2017, vol. 17, Issue 3, p. 1117-1124, China ).

范铮等，冬季微污染河流脱氮菌的筛选及鉴定，安全与环境工程，Dec. 1, 2015，第6期，P17-22，中国（Fan Zheng et al, Screening and Identification of Denitrifying Bacteria in Micro-polluted Rivers in Winter, Safety and Environmental Engineering, Dec. 1, 2015, Issue 6, p. 17-22, China ).

蒋归鸣等，游离和聚乙烯醇包埋门多萨假单胞菌好氧反硝化脱氮的研究，环境污染与防治，Oct. 15, 2015，第10期，P63-69，中国（Jiang Guiming et al, Research on aerobic denitrifying nitrogen removal by free and immobilized with PVA Pseudomonas mendocina WZUF20 strain, Environmental Pollution & Control, Oct. 15, 2015, Issue 10, p. 63-69, China ).

Yuxin Li et al, Pseudomonas mendocina LYX: a novel aerobic bacterium with advantage of removing nitrate high effectively by assimilation and dissimilation simultaneously, Front. Environ. Sci. Eng. 2021, 15(4): 57 (P1-10), Public date:Oct. 10, 2020, DOI: 10.1007/s11783-020-1349-3.

Fengxing Xie et al, Simultaneous heterotrophic nitrification and aerobic denitrification by a novel isolated Pseudomonas mendocina X49, Bioresource Technology 319 (2021) 124198 (p. 1-7), Public date:Oct. 2, 2020, DOI: 10.1016/j.biortech.2020.124198.

* cited by examiner

SEQUENCE LISTING

```
Sequence total quantity: 1
SEQ ID NO: 1           moltype = DNA   length = 1430
FEATURE                Location/Qualifiers
source                 1..1430
                       mol_type = genomic DNA
                       organism = Pseudomonas mendocina
SEQUENCE: 1
taggggcgc  taacacatgc  aagtcgagcg  gatgagagga  gcttgctcct  tgatttagcg   60
gcggacgggt gagtaatgcc  taggaatctg  cctggtagtg  ggggataacg  tccggaaacg  120
ggcgctaata ccgcatacgt  cctacgggag  aaagcagggg  accttcgggc  cttgcgctat  180
cagatgagcc taggtcggat  tagctagttg  gtgaggtaat  ggctcaccaa  ggcgacgatc  240
cgtaactggt ctgagaggat  gatcagtcac  actggaactg  agacacggtc  cagactccta  300
cgggaggcag cagtggggaa  tattggacaa  tgggcgaaag  cctgatccag  ccatgccgcg  360
tgtgtgaaga aggtcttcgg  attgtaaagc  actttaagtt  ggggaggaagg  gcattaacct  420
aatacgttag tgttttgacg  ttaccgacag  aataagcacc  ggctaacttc  gtgccagcag  480
ccgcggtaat acgaagggtg  caagcgttaa  tcggaattac  tgggcgtaaa  gcgcgcgtag  540
gtggttcgtt aagttggatg  tgaaagcccc  gggctcaacc  tgggaactgc  atccaaaact  600
ggcgagctag agtacggtag  agggtggtgg  aatttcctgt  gtagcggtga  aatgcgtaga  660
tataggaagg aacaccagtg  gcgaaggcga  ccacctggac  tgatactgac  actgaggtgc  720
gaaagcgtgg ggagcaaaca  ggattagata  ccctggtagt  ccacgccgta  aacgatgtca  780
actagccgtt gggttccttg  agaacttagt  ggcgcagcta  acgcattaag  ttgaccgcct  840
ggggagtacg gccgcaaggt  taaaactcaa  atgaattgac  gggggcccgc  acaagcggtg  900
gagcatgtgg tttaattcga  agcaacgcga  agaaccttac  ctggccttga  catgctgaga  960
actttccaga gatggattgg  tgccttcggg  aactcagaca  caggtgctgc  atggctgtcg 1020
tcagctcgtg tcgtgagatg  ttgggttaag  tcccgtaacg  agcgcaaccc  ttgtccttag 1080
ttaccagcgc gttatggtgg  gcactctaag  gagactgccg  gtgacaaacc  ggaggaaggt 1140
ggggatgacg tcaagtcatc  atggccctta  cggccagggc  tacacacgtg  ctacaatggt 1200
cggtacaaag ggttgccaag  ccgcgaggtg  gagctaatcc  cataaaaccg  atcgtagtcc 1260
ggatcgcagt ctgcaactcg  actgcgtgaa  gtcggaatcg  ctagtaatcg  tgaatcagaa 1320
tgtcacggtg aatacgttcc  cgggccttgt  acacaccgcc  cgtcacacca  tgggagtggg 1380
ttgctccaga agtagctagt  ctaaccttcg  ggggacggt   tacccagccg             1430
```

SALT-TOLERANT HETEROTROPHIC NITRIFICATION AEROBIC DENITRIFICATION PHOSPHORUS REMOVAL BACTERIAL STRAIN AND APPLICATION THEREOF

REFERENCE TO AN ELECTRONIC SEQUENCE LISTING

The content of the electronic sequence listing (2024-04-01-Sequence-Listing.xml; Size: 3430 bytes; and Date of Creation: Apr. 1, 2024) is herein incorporated by reference in its entirety.

TECHNICAL FIELD

This application relates to the field of microbiology, specifically involving a salt-tolerant heterotrophic nitrification aerobic denitrification phosphorus removal bacterial strain and its application.

BACKGROUND

With the continuous expansion of aquaculture, the production of various aquatic products has also increased. However, due to the disproportionate increase in aquaculture area and aquatic product production, a high-density and intensive aquaculture model has been developed. The high-protein feed that is fed to the fish is only partially utilized, with a large amount of nutrients (70-80%) being released into the surrounding environment. This not only accelerates and intensifies the pollution of aquaculture water bodies, but also leads to eutrophication of surrounding water bodies.

The quality of aquaculture water bodies constrains the development of aquaculture. Low concentrations of ammonia are toxic to fish, and the nitrite produced during the ammonia oxidation process is also toxic. To prevent significant fish mortality in aquaculture water bodies, which can cause economic losses and eutrophication of surrounding water bodies, it is necessary to control the levels of ammonia nitrogen, nitrate, nitrite, and phosphate in aquaculture water bodies. Traditional biological denitrification techniques include autotrophic nitrification and heterotrophic denitrification, which are independent stages. There are certain limitations in practical application. Additionally, the traditional phosphorus removal method involves using polyphosphate bacteria to aggregate and release phosphorus in aerobic-anaerobic environments, which requires different environmental conditions. In previous denitrification and phosphorus removal processes, nitrogen conversion to N2 occurs under anaerobic conditions, while phosphate removal occurs under aerobic conditions. This creates a contradiction when simultaneously achieving denitrification and phosphorus removal, leading to operational challenges. Therefore, it is necessary to find strains that can simultaneously perform heterotrophic nitrification, aerobic denitrification, and phosphorus removal. Recently, many strains have been discovered to simultaneously achieve nitrification and denitrification under aerobic conditions, overcoming the requirements of different oxygen environments. However, previous research has been conducted under freshwater conditions, neglecting the diversity and complexity of the environment, such as pH, salinity, and temperature, lacking practical applicability. Currently, there are only a few reports on salt-tolerant heterotrophic nitrification, aerobic denitrification strains, focusing on the removal of nitrogen elements but neglecting the removal of phosphorus elements. Phosphorus is also one of the important factors leading to eutrophication of water bodies. There are even studies that have found that controlling the input of nitrogen elements cannot control the eutrophication of lakes.

SUMMARY

To address the existing issues with current technology, this application provides a salt-resistant heterotrophic nitrification aerobic denitrification and phosphorus removal strain and its application. The strain is collected and bred in aquaculture ponds, and can efficiently degrade $NH_4^+$—N, $NO_3^-$—N, $NO_2^-$—N, and $PO_4^{3-}$—P under certain salinity conditions. It has the function of heterotrophic nitrification and aerobic denitrification, and the strain has good environmental adaptability and high safety. Therefore, it has a good application prospect in the biological denitrification and phosphorus removal of aquaculture effluent or other high-nitrogen, high-phosphorus, and high-salinity wastewater.

The purpose of the application is achieved by the following technical solutions:

a salt-tolerant heterotrophic nitrification aerobic denitrification phosphorus removal bacterial strain, the strain being *Pseudomonas mendocina* A4, deposited on Nov. 4, 2022, at Guangdong Microbial Culture Collection Center, located at Building 59, Floor 5, No. 100 Xianliezhong Middle Road, Yuexiu District, Guangzhou City, Guangdong Province, with the deposit number GDMCC No: 62944.

The aforementioned salt-tolerant heterotrophic nitrification aerobic denitrification phosphorus removal bacterial strain, *Pseudomonas mendocina* A4, is applied in the field of nitrogen and phosphorus-containing wastewater treatment.

Preferably, when the *Pseudomonas mendocina* A4 is applied in the treatment of nitrogen and phosphorus-containing wastewater, the carbon source of the wastewater is at least one of sodium citrate, sodium succinate, sucrose, and glucose.

More preferably, the carbon source of the wastewater is sodium succinate.

Preferably, when the *Pseudomonas mendocina* A4 is applied in the treatment of nitrogen and phosphorus-containing wastewater, the C/N (Total carbon/Total nitrogen) ratio of the wastewater is 0~15.

More preferably, the C/N ratio of the wastewater is 10.

Preferably, when the *Pseudomonas mendocina* A4 is applied in the treatment of nitrogen and phosphorus-containing wastewater, the P/N (Total phosphorus/Total nitrogen) ratio of the wastewater is 0~1.

More preferably, the P/N ratio of the wastewater is 0.2.

Preferably, when the *Pseudomonas mendocina* A4 is applied in the treatment of nitrogen and phosphorus-containing wastewater, the pH of the wastewater is 5~9.

More preferably, the pH of the wastewater is 7.

Preferably, when the *Pseudomonas mendocina* A4 is applied in the treatment of nitrogen and phosphorus-containing wastewater, the temperature of the wastewater is 25° C.~40° C.

More preferably, the temperature of the wastewater is 25~40° C.

Preferably, when the *Pseudomonas mendocina* A4 is applied in the treatment of nitrogen and phosphorus-containing wastewater, the salinity of the wastewater is 0~15%.

More preferably, the salinity of the wastewater is 0~5%.

The beneficial effects of the present application are as follows:

(1) *Pseudomonas mendocina* A4 selected and bred in the present application is applied in the field of nitrogen and phosphorus wastewater treatment. Under completely aerobic conditions, the strain can use $NH_4^+$, $NO_3^-$, and $NO_2^-$ as the sole inorganic nitrogen sources for aerobic nitrification and denitrification. The degradation efficiency can reach up to 99.58%, 99.99%, and 99.83% respectively.

(2) *Pseudomonas mendocina* A4 selected and bred in the present application simultaneously possesses heterotrophic nitrification and aerobic denitrification functions. It can simultaneously use various organic carbon sources and has a strong tolerance to high concentrations of organic carbon, with a good ability to remove organic carbon from water. This strain is particularly suitable for the treatment of nitrogen-containing wastewater with a high C/N ratio.

(3) *Pseudomonas mendocina* A4 selected and bred in the present application can better utilize organic substrates, with a fast growth rate and easy attainment of high biomass concentration, while maintaining a high denitrification rate and achieving organic carbon removal.

(4) The strain selected and bred in the present application can not only carry out a good HNAD process under high salinity, but also effectively remove phosphate. In previous salt tolerance studies, the salinity range was 0% to 10%, while in this experiment, the salinity range was 0% to 15%. The salt tolerance of the isolated strain in the present application has been significantly improved, and the denitrification and phosphate removal effects within this salinity range are not affected. This strain can be applied not only to conventional aquaculture water with salt content, but also to the denitrification and phosphate removal in high-salinity water bodies, to a certain extent, breaking through the limitation of salinity on the microbial treatment of saline wastewater.

(5) The *Pseudomonas mendocina* A4 selected and bred in the present application can overcome the incompatible problem of nitrification-denitrification caused by different oxygen demands, making it possible to synchronize nitrification and denitrification in the same aerobic reactor. The application of this strain in the microbial nitrogen removal process of aquaculture water bodies is conducive to reducing the footprint and construction cost of the equipment, improving treatment efficiency, and significantly reducing the periodic water exchange in the aquaculture process, with good economic and environmental benefits and broad application prospects.

BRIEF DESCRIPTION OF THE DRAWINGS

The accompanying drawings are used to further illustrate the present application, but the embodiments in the drawings do not constitute any limitation on the present application. Skilled persons in the art can obtain other drawings based on the following drawings without any creative work.

DETAILED DESCRIPTION OF THE EMBODIMENTS

Figure 1:
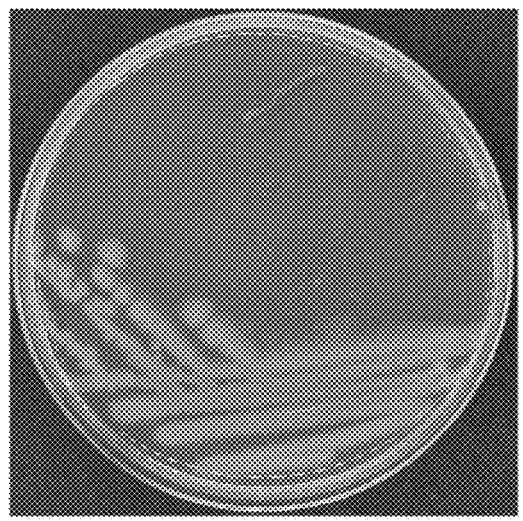
FIG. 1 is a colony morphology of *Pseudomonas mendocina* A4, an embodiment of the present application, on a nutrient agar plate.
Figure 2:
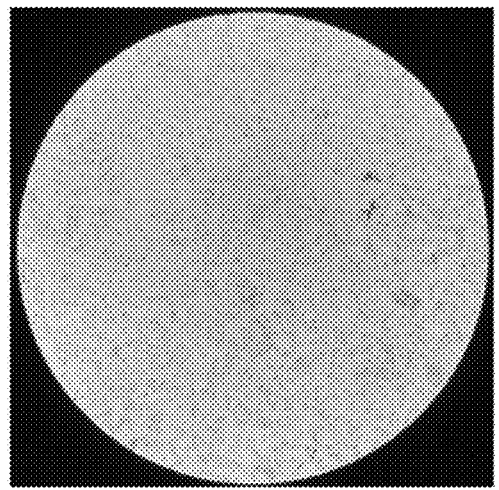
FIG. 2 is a Gram stain image of *Pseudomonas mendocina* A4, an embodiment of the present application.

To more clearly illustrate the present application, the technical features, objectives, and beneficial effects of the present application will be further understood in conjunction with FIGS. 1-8 and embodiments. The technical solution of the present application is now detailed below, but should not be construed as limiting the scope of the present application.

In the experiments of the present application, the determination and analysis methods for three nitrogen elements $NH_4^+$, $NO_3^-$, and $NO_2^-$ referred to the national standards, including:

$NH_4^+$ determination and analysis according to the "Water quality—Determination of Ammonia Nitrogen—Nessler's Reagent Spectrophotometry" (GB HJ535-2009);

$NO_3^-$ determination and analysis according to the "Water quality—Determination of Nitrate Nitrogen—Ultraviolet Spectrophotometry" (GB HJ/T346-2007);

$NO_2^-$ determination and analysis according to the "Water quality—Determination of Nitrite Nitrogen—Spectrophotometry" (GB 7493-87);

$PO_4^{3-}$—P using the ammonium molybdate spectrophotometric method.

The embodiment provides a salt-tolerant heterotrophic nitrification aerobic denitrification and phosphorus-removing bacterial strain, the strain being *Pseudomonas mendocina* A4, deposited on Nov. 4, 2022, at the Guangdong Microbial Culture Collection Center, located at Building 59, 5th Floor, No. 100 Xianlie Middle Road, Yuexiu District, Guangzhou, Guangdong Province, with the deposit number GDMCCNo: 62944.

This strain is a *Pseudomonas mendocina* strain collected and bred by the inventors' team from aquaculture ponds in Guangdong Province, and has been endowed with the biological characteristics of efficient degradation of $NH_4^+$—N, $NO_3^-$—N, $NO_2^-$—N, and $PO_4^{3-}$—P under certain salinity conditions. It is gram-stain negative, with white opaque colonies on nutrient agar, raised surface, circular, smooth, moist, and shiny, with intact edges, rod-shaped cells, and no flagella. It has the function of heterotrophic nitrification and aerobic denitrification.

The adaptability and safety of the *Pseudomonas mendocina* A4 strain are good, therefore it has good application prospects in the biological denitrification and phosphorus removal treatment of aquaculture effluent or other high-nitrogen and phosphorus-containing high-salt sewage.

The raw materials, reagents, or devices used in the following embodiments can be obtained from conventional commercial sources, unless otherwise specified, or can be obtained by existing known methods.

The present application is further described with multiple specific implementation examples below.

Embodiment 1

This embodiment provides a strain of *Pseudomonas mendocina* A4 (GDMCC No: 62944) with both heterotrophic nitrification and aerobic denitrification functions. The breeding process includes the following steps:

Sample Collection

The original strain of *Pseudomonas mendocina* A4 of the present application was obtained by screening and isolating water and mud samples from the breeding ponds in Nanshui Area, Doumen District, Zhuhai City, Guangdong Province. The sample collection was conducted according to the "Mixed Sample Collection Method" in the "Technical Specifications for Soil Environment Monitoring" (HJ/T 166-2004), using the plum blossom point sampling method to collect surface, middle, and deep water and bottom sediment from the breeding ponds in sterile sampling bags, which were then transported and stored at 4° C.

2. Preparation of Culture Media and Solutions
  (1) Salt Solution (g/L): NaCl 2.5 g, $MgSO_4 \cdot 7H_2O$ 2.5 g, $FeSO_4 \cdot 7H_2O$ 0.05 g, $MnSO_4 \cdot 4H_2O$ 0.05 g;
  (2) Trace Element Solution (g/L): $MgSO_4 \cdot 7H_2O$ 50.0 g, $CaCl_2$) 5.5 g, $CuSO_4 \cdot 5H_2O$ 1.57 g, $ZnSO_4 \cdot 7H_2O$ 2.2 g, $FeSO_4$, 5.0 g, $MnCl_2 \cdot 4H_2O$ 5.06 g, $CoCl_2 \cdot 6H_2O$ 1.60 g, $Na_2EDTA$, 50.0 g;
  (3) Enrichment Culture Medium (g/L): 5.62 g sodium succinate, 0.087 g $KH_2PO_4$, 0.24 g $NaNO_3$, 0.165 g $NaNO_2$, 0.472 g $(NH_4)_2SO_4$, 50 mL salt solution;
  (4) BTB Medium (g/L): Sodium citrate dihydrate 6.45 g, 1% BTB ethanol solution 1 mL, $KH_2PO_4$ 1.5 g, $MgSO_4 \cdot 7H_2O$ 0.01 g, $Na_2HPO_4$ 7.9 g, $NaNO_3$ 0.8415 g, $NH_4Cl$ 0.192 g, $NaNO2$ 0.362 g, trace element solution 2 mL, agar 20 g, pH 7.0~7.5;
  (5) Single Nitrogen Source Fermentation Medium (DMI) (g/L): 5.62 g sodium succinate, 0.087 g $KH_2PO_4$, 0.472 g $(NH_4)_2SO_4$, trace element solution 2 mL, pH 7.0;
  (6) Single Nitrogen Source Fermentation Medium (DMII) (g/L): 5.62 g sodium succinate, 0.087 g $KH_2PO_4$, 0.607 g $NaNO_3$, trace element solution 2 mL, pH 7.0;
  (7) Single Nitrogen Source Fermentation Medium (DMIII) (g/L): 5.62 g sodium succinate, 0.087 g $KH_2PO_4$, 0.4928 g $NaNO_2$, trace element solution 2 mL, pH 7.0.

The basic culture media used in the experiments were sterilized at 121° C. for 20 minutes using high-pressure steam before use.

Embodiment 2

A method for selecting a strain of *Pseudomonas mendocina* A4 with both heterotrophic nitrification and aerobic denitrification functions, including enrichment, isolation, and screening of the original strain of *Pseudomonas mendocina* A4, specifically including the following steps:

(1) Sample pretreatment: Take 10 g of pond mud, add it to a 300 mL wide-mouth triangular flask containing 90 mL of 0.9% sterile physiological saline solution on a super clean workbench, and add a few glass beads that have been sterilized by high-pressure steam at 121° C. for 15 minutes, and shake at 160 r/min for 1 h to disperse the mud sample, so that the microorganisms in the mud sample are fully suspended in the physiological saline solution; the water sample is treated similarly;

(2) Enrichment culture: Take 22.2 mL of the above-mentioned mixed liquid ($10^{-1}$ mud) and add it to a 500 mL conical flask containing 200 mL of enrichment culture medium, and shake at 30° C. and 160 r/min for 2~3 days. For the water sample, take 10 mL and inoculate it into a 300 mL wide-mouth triangular flask containing 90 mL of enrichment culture medium, and shake at 30° C. and 160 r/min for 1 h;

(3) Sample plate coating: Take 1 mL of the pretreated water sample and mud sample from (1), add it to a test tube containing 9 mL of sterile physiological saline solution on a super clean workbench, and gently blow or shake with a pipette to mix. Take 1 mL of the liquid from the test tube and add it to a new test tube containing 9 mL of sterile physiological saline solution, repeat this operation, and dilute the $10^{-1}$ mud and water sample original solutions to $10^{-2}$~$10^{-4}$ concentrations. Take 100 μL~200 μL of the original solution of sediment and water samples at concentrations of $10^{-1}$~$10^{-4}$, and directly plate them on BTB agar medium, with 3 parallel groups set for each gradient, 1 blank control group, and incubate upside down at 30° C. in a constant temperature biochemical incubator for 2~3 days;

(4) Sample enrichment liquid plate coating: dilute the gradient of the enriched culture suspension from (2) as follows: take 1 mL of the bacterial suspension from the conical flask in (2) and add it to a test tube containing 9 mL of sterile physiological saline solution, mix thoroughly, and dilute the concentration to $10^{-1}$. Then, take 1 mL of liquid from this test tube and add it to a new test tube containing 9 mL of sterile physiological saline solution, mix thoroughly, and repeat this step, sequentially diluting to reach concentrations of $10^{-2}$~$10^{-8}$. Then take 100 μL~200 μL from each concentration gradient mixture and plate them on a pre-made BTB solid plate medium, indicating the dilution gradient and date, and incubate upside down at 30° C. in a constant temperature biochemical incubator for 2~3 days;

(5) Separation and purification: Using an inoculation loop to pick different morphological colonies. Use the streaking method on BTB solid plate medium for isolation and purification. After streaking, the plates are placed in a laminar flow hood at room temperature for 5 minutes and then inverted and incubated at 30° C. in a constant temperature biochemical incubator for 2~3 days. Repeat this step, pick single colonies, and streak for purification 3~4 times.

After observing no morphological abnormalities in the colonies, pick single colonies, perform a crystal violet stain, and examine under a microscope for purity (100× oil immersion lens);

(6) Spot inoculation initial screening: Use an inoculation needle to spot inoculate the purified strains on BTB denitrification identification medium and culture for 2~3 days. Select strains with high denitrification capabilities based on colony growth and the size of the blue halo around the colonies on the BTB medium. Generally, the larger the blue halo, the higher the denitrification capability. After incubation at 30° C. on a slant for 2~3 days, the test tubes are stored at 4° C.;

(7) Nitration and denitrification performance re-screening: Use an inoculation loop to take the obtained strains for activation and inoculate them on a slant in nutrient broth, shaking at 30° C., 160 r/min for 1 day, and measure their $OD_{600}$. Then, inoculate with 1% inoculum into an enriched culture medium, shaking at 30° C., 160 r/min for 0 h, 12 h, 24 h, 36 h, 48 h, and measure the $OD_{600}$ of the culture at each time point. After low-speed centrifugation at 12000 rpm, 4° C. for 5 min, measure the content of $NH_4^+$—N, $NO_3^-$—N, $NO_2^-$—N, and $PO_4^{3-}$—P in the supernatant, and select the strain with the best biological characteristics as *Pseudomonas mendocina* A4.

Embodiment 3

The biological characteristics identification steps for the strain *Pseudomonas mendocina* A4, which was re-screened and found to have both heterotrophic nitrification and aerobic denitrification functions, include:
(1) Morphological identification: After the above screening and isolation, a strain of heterotrophic nitrification-aerobic denitrification bacterium A4 was obtained. This strain is gram-negative, rod-shaped, and non-flagellated. The colonies on nutrient agar are white, opaque, raised, circular, smooth, moist, and shiny, with a complete edge.
(2) Molecular biology identification: The DNA extraction of strain A4 is carried out using Takara Lysis Buffer for Microorganism to Direct PCR. The 16S rDNA is amplified using a pair of universal primers: upstream primer (27F): 5'-AGAGTTTGATCCTGGCTCAG-3'; downstream primer (1492R): 5'-GGCTACCTTGT-TACGACTT-3'. The universal primers are synthesized by Shanghai Bioengineering Co., Ltd. The PCR reaction system (25 μL) consists of 2×Unique™Taq Master Mix (With Dye) 12.5 μL, 1 μL of each upstream and downstream primer, 1 μL of DNA template, and 9.5 μL of dd$H_2O$. The PCR program is as follows: ① 94° C., 5 min; ②94° C. pre-denaturation, 1 min; ③ 55° C. annealing, 1 min; ④ 72° C. extension 1.5 min; ⑤ 72° C., 10 min; cycles of ② ~④ are repeated 30 times. The results are analyzed by 1% agarose gel electrophoresis. The PCR product sequencing is completed by Shanghai Bioengineering Co., Ltd.

After the above screening, cultivation, and isolation, a strain with the best biological characteristics and stable properties of heterotrophic nitrification-aerobic denitrification, namely *Pseudomonas mendocina* A4, is obtained. The physiological and biochemical characteristics of this strain are shown in Table 1 below.

TABLE 1

| Item | Result | Item | Result | Item | Result |
|---|---|---|---|---|---|
| Gelatin liquefaction | − | Starch hydrolysis | − | Methyl red | + |
| SIM | − | Indole production | + | V-P test | + |
| Sucrose | + | Triple sugar iron agar | − | Growth: 41° C. | + |
| Lactose | + | D-(+)-glucose | + | Glycerol | − |
| D-lactose | − | D-xylose | + | D-fructose | + |
| L-phenylalanine | − | Mannitol | − | Citrate | + |
| $H_2S$ production | − | | | | |

Note:
"+" indicates positive; "−" indicates negative.

After the above screening steps, a strain of heterotrophic nitrification-aerobic denitrification bacterium A4 was obtained. Based on its 16S rDNA, bacterial morphology, colony morphology, and physiological and biochemical characteristics, it is determined that strain A4 belongs to *Pseudomonas mendocina*.

Embodiment 4

The above-mentioned heterotrophic nitrifying-aerobic denitrifying bacterium *Pseudomonas mendocina* A4 (hereinafter referred to as strain A4), which simultaneously possesses the functions of heterotrophic nitrification and aerobic denitrification, is applied in the field of wastewater treatment. The testing and validation of its optimal growth and denitrification conditions include the following steps:
(1) Influence of Different Organic Carbon Sources on the Growth and Denitrification Performance of Strain A4

Four carbon sources, sucrose, sodium succinate, glucose, and sodium citrate, are selected. With a fixed C/N ratio of 10, the experiment is conducted at 30° C., 160 rpm/min, and pH=7.0. Based on the DM fermentation culture medium, the amount of each organic carbon source added per liter of culture medium is 5.00 g for sucrose, 5.62 g for sodium succinate, 2.50 g for glucose, and 4.08 g for sodium citrate. As a single inorganic nitrogen source, the amounts of $(NH_4)_2SO_4$, $NaNO_3$, and $NaNO_2$ added per liter of culture medium are 0.472 g, 0.607 g, and 0.493 g, respectively. The candidate strains are inoculated into nutrient broth culture medium and incubated at 30° C., 160 r/min for 1 day. Then, with a 1% inoculation amount, they are inoculated into the denitrification culture medium with different organic carbon sources, and the culture liquid is taken at 0 h, 4 h, 8 h, 12 h, 24 h, 36 h, 48 h to measure their $OD_{600}$. After low-speed centrifugation at 5000 r/min, 4° C. for 5-10 min, the supernatant is taken to measure the content of $NH_4^+$—N, $NO_3^-$—N, $NO_2^-$—N, and $PO_4^{3-}$—P. The experiment sets up three technical replicates of the experimental group and one blank control group, with the control group receiving an equal amount of physiological saline. The analysis examines the effects of four different organic carbon sources-sucrose, sodium succinate, glucose, and sodium citrate-on the growth denitrification and phosphorus removal effects of strain A4.

Figure 3:
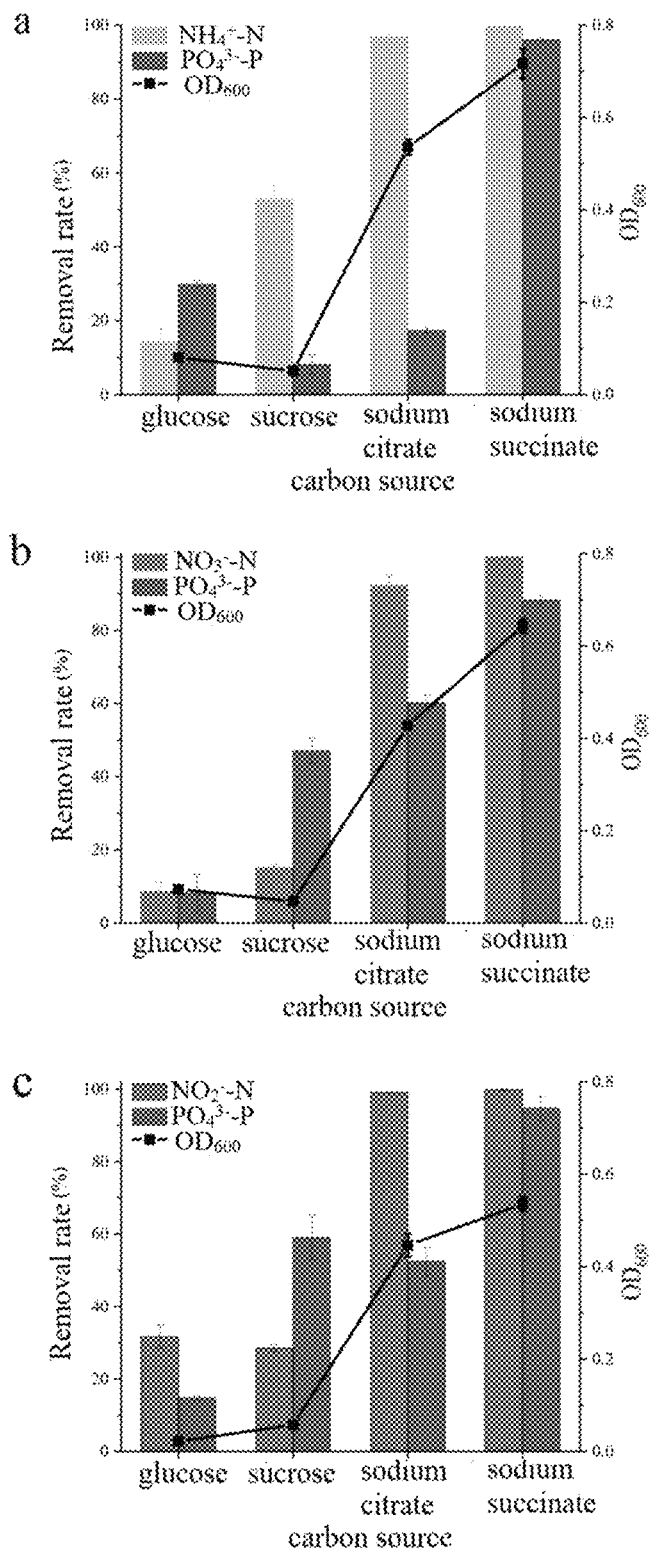
FIG. 3 is a comparison of the growth and denitrification effects of *Pseudomonas mendocina* A4, an embodiment of the present application, under different organic carbon sources and different inorganic nitrogen sources.

FIG. 3 shows the nitrogen and phosphorus removal by *Pseudomonas mendocina* A4 under different carbon source conditions; wherein: (a) Ammonium nitrogen and phosphate removal rate; (b) Nitrate and phosphate removal rate; (c) Nitrite and phosphate removal rate.
(2) Influence of Different C/N Ratios on the Growth and Denitrification Performance of Strain A4

Sodium succinate is selected as the carbon source in the denitrification culture medium. Under fixed conditions of 30° C., 160 r/min, P/N=0.2, and pH=7.0, C/N gradients of 0, 2, 5, 10, 15 were set. The amount of sodium succinate added to the culture medium for each gradient is 0 g/L, 1.125 g/L, 2.812 g/L, 5.62 g/L, 8.44 g/L; as a single inorganic nitrogen source, the amounts of $(NH_4)_2SO_4$, $NaNO_3$, and $NaNO_2$ added per liter of culture medium are 0.472 g, 0.607 g, and 0.493 g, respectively. The candidate strains were inoculated into a nutrient broth medium and cultured at 30° C. and 160 r/min for one day. Then, 1% of the inoculum was added to the above-mentioned media at 0 h, 4 h, 8 h, 12 h, 24 h, 36 h, and 48 h. The culture liquid was taken to measure its $OD_{600}$, and after low-speed centrifugation at 5000 r/min and 4° C. for 5~10 minutes, the supernatant was taken to measure the content of $NH_4^+$—N, $NO_3^-$—N, $NO_2^-$—N, and $PO_4^{3-}$—P. The experiment sets up three technical replicates of the experimental group and one blank control group, with the control group receiving an equal amount of physiological saline. The analysis examines the effects of five different C/N ratios (0, 2, 5, 10, 15) on the growth and denitrification and phosphorus removal effects of strain A4.

Figure 4:
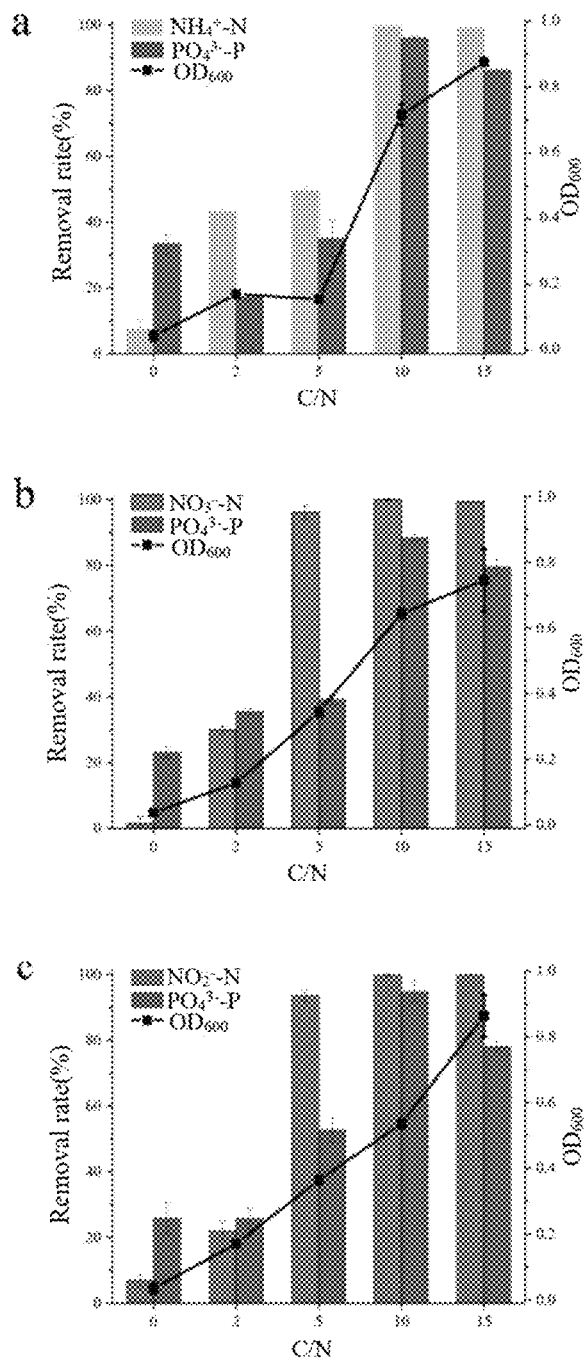
FIG. 4 is a comparison of the growth and denitrification effects of *Pseudomonas mendocina* A4, an embodiment of the present application, under different C/N ratios and different inorganic nitrogen sources.

FIG. 4 shows the nitrogen and phosphorus removal by *Pseudomonas mendocina* A4 under different C/N ratios; where: (a) Ammonium nitrogen and phosphate removal rate; (b) Nitrate and phosphate removal rate; (c) Nitrite and phosphate removal rate.

Figure 5:
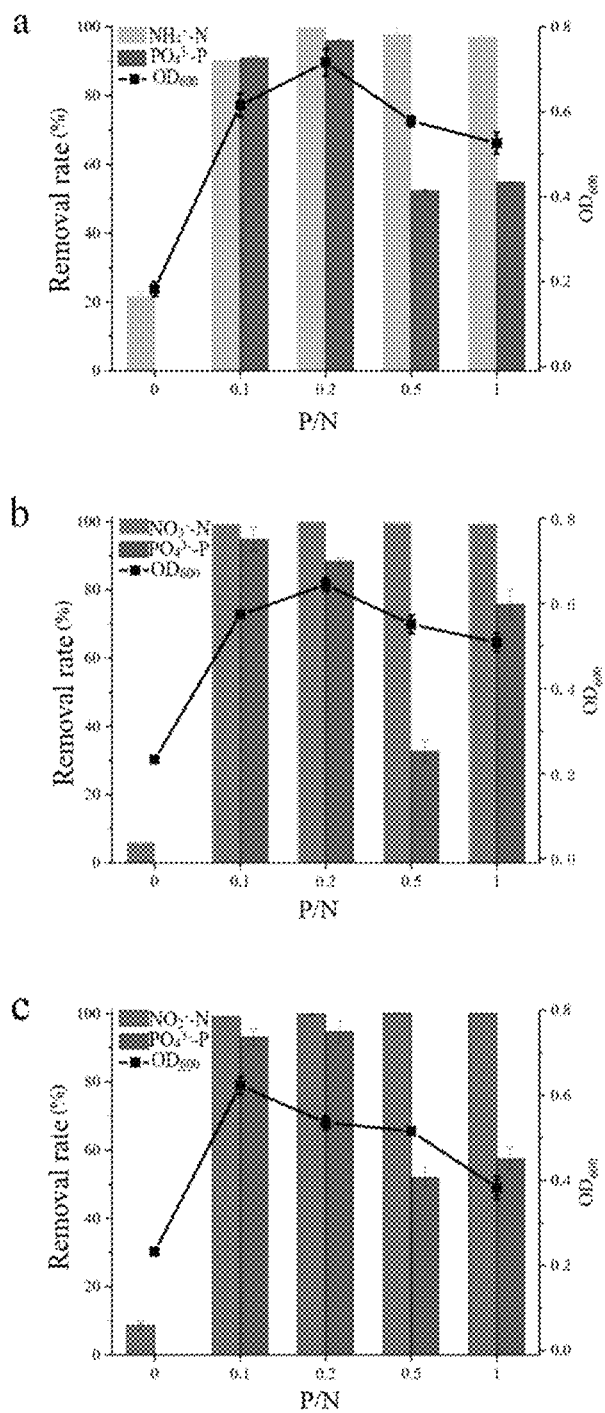
FIG. 5 is a comparison of the growth and denitrification effects of *Pseudomonas mendocina* A4, an embodiment of the present application, under different P/N ratios and different inorganic nitrogen sources.

FIG. 5 shows the nitrogen and phosphorus removal by *Pseudomonas mendocina* A4 under different P/N ratios; where: (a) Ammonium nitrogen and phosphate removal rate; (b) Nitrate and phosphate removal rate; (c) Nitrite and phosphate removal rate.

(3) Influence of Different C/N Ratios on the Growth and Denitrification Performance of Strain A4

Sodium succinate is selected as the carbon source in the denitrification culture medium. Under fixed conditions of 30° C., 160 r/min, C/N=10, and pH=7.0, P/N gradients of 0, 0.1, 0.2, 0.5, and 1 were set. The amount of $KH_2PO_4$ added to the culture medium for each gradient was 0.0000 g/L, 0.0430 g/L, 0.0870 g/L, 0.2193 g/L, 0.4387 g/L; as a single inorganic nitrogen source, the amounts of $(NH_4)_2SO_4$, $NaNO_3$, and $NaNO_2$ added per liter of culture medium are 0.472 g, 0.607 g, and 0.493 g, respectively. The candidate strains were inoculated into a nutrient broth medium and cultured at 30° C. and 160 r/min for one day. Then, 1% of the inoculum was added to the above-mentioned media at 0 h, 4 h, 8 h, 12 h, 24 h, 36 h, and 48 h. The culture liquid was taken to measure its $OD_{600}$, and after low-speed centrifugation at 5000 r/min and 4° C. for 5~10 minutes, the supernatant was taken to measure the content of $NH_4^+$—N, $NO_3^-$—N, $NO_2^-$—N, and $PO_4^{3-}$—P. The experiment sets up three technical replicates of the experimental group and one blank control group, with the control group receiving an equal amount of physiological saline. The analysis examines the effects of five different P/N ratios (0, 0.1, 0.2, 0.5, 1) on the growth and denitrification and phosphorus removal effects of strain A4.

(4) Influence of Different pH on the Growth and Denitrification Performance of Strain A4

Under fixed conditions of C/N=10, P/N=0.2, 30° C., 160 r/min, and sodium succinate as the sole organic carbon source, pH gradients of 5, 6, 7, 8, and 9 were set. The amounts of $(NH_4)_2SO_4$, $NaNO_3$, and $NaNO_2$ added per liter of culture medium as single inorganic nitrogen sources were 0.472 g, 0.607 g, and 0.493 g, respectively. Candidate strains were inoculated into a nutrient broth medium and cultured at 30° C., 160 r/min for one day. Then, 1% of the inoculum is transferred to the above-mentioned culture media, and the culture liquid is sampled at 0 h, 4 h, 8 h, 12 h, 24 h, 36 h, and 48 h to determine its $OD_{600}$. After low-speed centrifugation at 5000 r/min and 4° C. for 5~10 minutes, the supernatant is collected to measure the content of $NH_4^+$—N, $NO_3^-$—N, $NO_2^-$—N, and $PO_4^{3-}$—P. The experiment includes three technical replicates and a blank control group with an equal amount of physiological saline added. The impact of five different pH levels (5, 6, 7, 8, 9) on the growth denitrification and phosphorus removal effects of strain A4 is analyzed.

Figure 6:
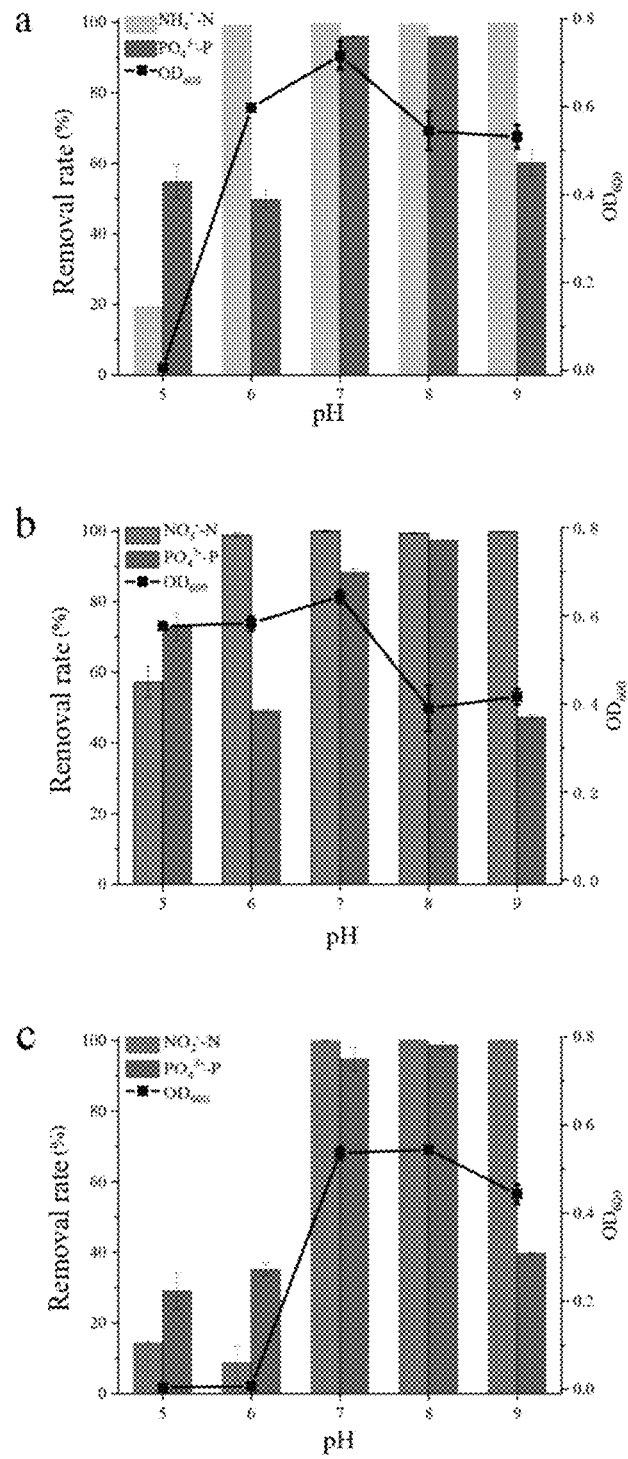
FIG. 6 is a comparison of the growth and denitrification effects of *Pseudomonas mendocina* A4, an embodiment of the present application, under different pH and different inorganic nitrogen sources.

FIG. 6 shows the nitrogen and phosphorus removal by *Pseudomonas mendocina* A4 under different pH conditions; where: (a) Ammonium nitrogen and phosphate removal rate; (b) Nitrate and phosphate removal rate; (c) Nitrite and phosphate removal rate.

(5) Influence of Different Temperatures on the Growth and Denitrification Performance of Strain A4

Under fixed conditions of C/N=10, pH=7.0, 160 r/min, and sodium citrate as the sole organic carbon source, temperature gradients of 25° C., 30° C., 35° C., 40° C. are set. The amounts of $(NH_4)_2SO_4$, $NaNO_3$, and $NaNO_2$ added per liter of culture medium as single inorganic nitrogen sources are 0.472 g, 0.607 g, and 0.493 g, respectively. Candidate strains are inoculated into a nutrient broth medium and cultured at 30° C., 160 r/min for one day. Then, 1% of the inoculum is transferred to the above-mentioned culture media, and the culture liquid is sampled at 0 h, 4 h, 8 h, 12 h, 24 h, 36 h, and 48 h to determine its $OD_{600}$. After low-speed centrifugation at 5000 r/min and 4° C. for 5~10 minutes, the supernatant is collected to measure the content of $NH_4^+$—N, $NO_3^-$—N, $NO_2^-$—N, and $PO_4^{3-}$—P. The experiment includes three technical replicates and a blank control group with an equal amount of physiological saline added. The impact of four different temperatures (25° C., 30° C., 35° C., 40° C.) on the growth and denitrification and phosphorus removal effects of strain A4 is analyzed.

Figure 7:
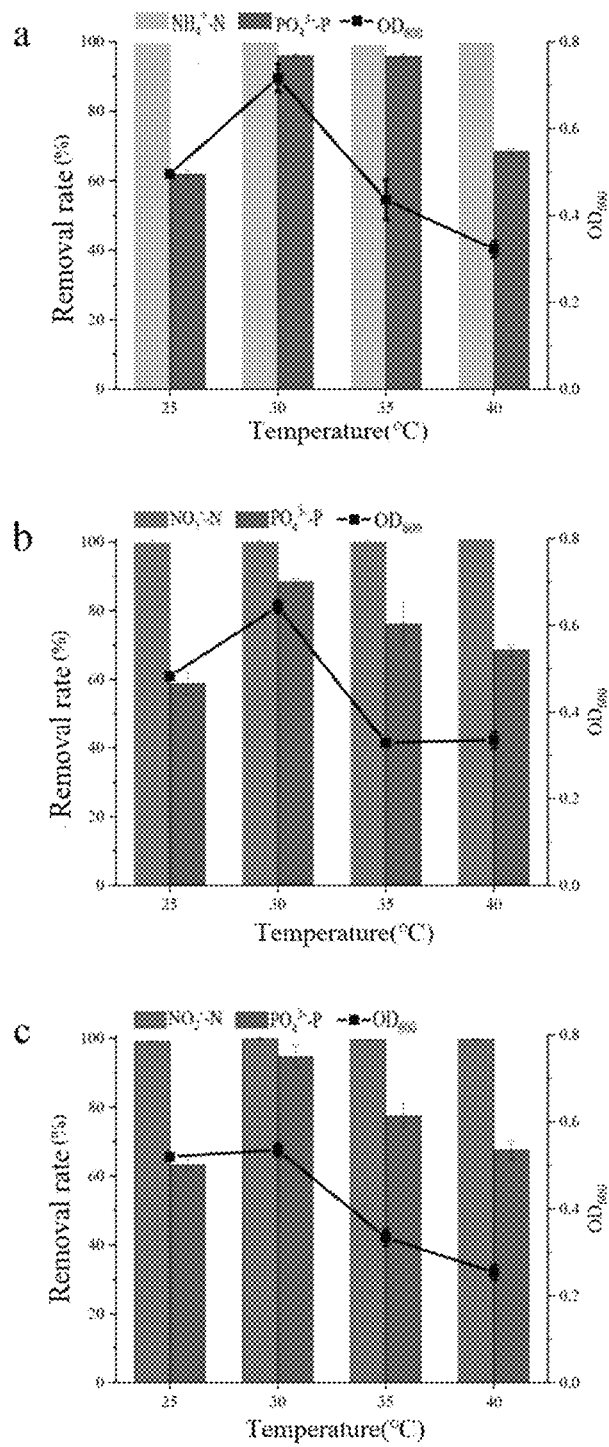
FIG. 7 is a comparison of the growth and denitrification effects of *Pseudomonas mendocina* A4, an embodiment of the present application, under different temperatures and different inorganic nitrogen sources.

FIG. 7 shows the nitrogen and phosphorus removal by *Pseudomonas mendocina* A4 under different temperature conditions; where: (a) Ammonium nitrogen and phosphate removal rate; (b) Nitrate and phosphate removal rate; (c) Nitrite and phosphate removal rate.

(6) Influence of Different Salinities on the Growth and Denitrification Performance of Strain A4.

Under fixed conditions of C/N=10, P/N=0.2, pH=7.0, 160 r/min, and sodium succinate as the sole organic carbon source, salinity gradients of 0%, 3%, 5%, 10%, and 15% are set. Salinity is controlled by adding NaCl, with corresponding amounts of 0 g, 3 g, 5 g, 10 g, and 15 g per 100 mL of culture medium. The amounts of $(NH_4)_2SO_4$, $NaNO_3$, and $NaNO_2$ added per liter of culture medium as single inorganic nitrogen sources are 0.472 g, 0.607 g, and 0.493 g, respectively. Candidate strains are inoculated into a nutrient broth medium and cultured at 30° C., 160 r/min for one day. Then, 1% of the inoculum is transferred to the above-mentioned culture media, and the culture liquid is sampled at 0 h, 4 h, 8 h, 12 h, 24 h, 36 h, and 48 h to determine its $OD_{600}$. After low-speed centrifugation at 5000 r/min and 4° C. for 5~10 minutes, the supernatant is collected to measure the content of $NH_4^+$—N, $NO_3^-$—N, $NO_2^+$-N, and $PO_4^{3-}$—P. The experiment includes three technical replicates and a blank control group with an equal amount of physiological saline added. The impact of five different salinities (0%, 3%, 5%, 10%, 15%) on the growth and denitrification and phosphorus removal effects of strain A4 is analyzed.

Figure 8:
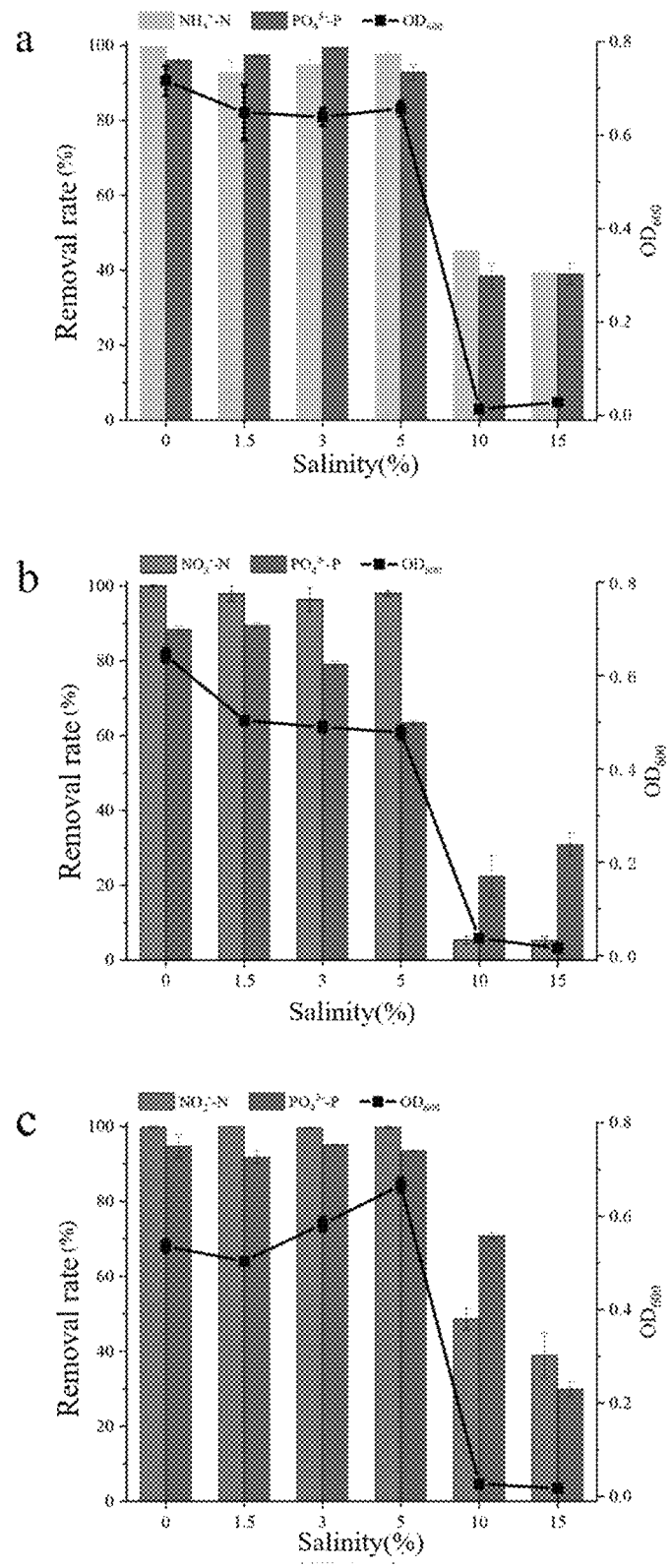
FIG. 8 is a comparison of the growth and denitrification effects of *Pseudomonas mendocina* A4, an embodiment of the present application, under different salinities and different inorganic nitrogen sources.

FIG. 8 shows the nitrogen and phosphorus removal by *Pseudomonas mendocina* A4 under different salinity conditions: Ammonium nitrogen and phosphate removal rate (a); Nitrate and phosphate removal rate (b); Nitrite and phosphate removal rate (c).

From Embodiment 4 (FIGS. 3-8) and Embodiment 3 (Table 1), it can be seen that *Pseudomonas mendocina* A4 can grow using various organic carbon sources such as sodium citrate and sodium succinate. The best growth and nitrogen and phosphorus removal effects are observed when using sodium succinate as the carbon source. The strain can grow under C/N ratios of 0~15, P/N ratios of 0~1, pH of 6~9, and temperatures of 25° C.~40° C. Even under a C/N ratio of 0, the strain A4 can still grow, indicating its ability to aggregate and release phosphorus for energy metabolism. When the P/N ratio is 0, the nitrogen removal efficiency is significantly lower than when the P/N ratio is 0.1, indicating that phosphorus is essential for the growth metabolism of strain A4. The optimal denitrification conditions are using sodium succinate as the carbon source, C/N=10, P/N=0.2, pH=7, and T=30° C. The denitrification efficiency of strain A4 is 99.58%, 990.99%, and 99.83%, with corresponding phosphorus removal rates of 95.96%, 880.28%, and 94.69%. Under the optimal denitrification and phosphorus removal conditions, increasing salinity from 0% to 5% does not show a statistically significant difference in the corresponding nitrogen and phosphorus removal rates, indicating its good tolerance to salinity.

The *Pseudomonas mendocina* A4 bred in the present application can be applied to the treatment of nitrogen and phosphorus-containing wastewater in saltwater aquaculture, without adverse effects on aquaculture organisms, and has high aquatic biologic safety, suitable for application in most aquaculture waters. The strain has both heterotrophic nitrification and aerobic denitrification, as well as phosphorus removal functions. It can utilize multiple organic carbon sources while exhibiting strong tolerance to high concentrations of organic carbon and salinity, and has a good ability to remove organic carbon in water. The strain is particularly suitable for the treatment of nitrogen-containing wastewater with a high C/N ratio. Under fully aerobic conditions, the strain can use $NH_4^+$, $NO_3^-$, and $NO_2^-$ as the sole inorganic nitrogen sources for aerobic nitrification and denitrification. The strain can overcome the incompatibility problem between nitrification and denitrification caused by different oxygen requirements, making it possible to synchronize nitrification and denitrification in the same aerobic reactor, with good economic and environmental benefits and broad application prospects.

Finally, it should be noted that the above embodiments are only used to illustrate the technical solution of the present application, and not to limit the scope of the present application. Although the best embodiments have been described in detail concerning the present application, those skilled in the art should understand that the technical solution of the present application can be modified or replaced with equivalent alternatives without departing from the essence and scope of the present application.

What is claimed is:

1. An application of a salt-tolerant heterotrophic nitrification aerobic denitrification and phosphorus removal bacterial strain, wherein *Pseudomonas mendocina* A4 is used in a field of wastewater treatment by applying the bacterial strain in wastewater, where the wastewater is nitrogen and phosphorus-containing wastewater in saltwater aquaculture.

2. The application of the salt-tolerant heterotrophic nitrification aerobic denitrification and phosphorus removal bacterial strain as claimed in claim 1, wherein a carbon source of the wastewater is at least one of sodium citrate, sodium succinate, sucrose, and glucose.

3. The application of the salt-tolerant heterotrophic nitrification aerobic denitrification and phosphorus removal bacterial strain as claimed in claim 2, wherein the carbon source of the wastewater is sodium succinate.

4. The application of the salt-tolerant heterotrophic nitrification aerobic denitrification and phosphorus removal bacterial strain as claimed in claim 1, wherein *Pseudomonas mendocina* A4 is used in the treatment of nitrogen and phosphorus-containing wastewater, with a C/N ratio of 0 to 15.

5. The application of the salt-tolerant heterotrophic nitrification aerobic denitrification and phosphorus removal bacterial strain as claimed in claim 1, wherein *Pseudomonas mendocina* A4 is used in the treatment of nitrogen and phosphorus-containing wastewater, with a C/N ratio of 10.

6. The application of the salt-tolerant heterotrophic nitrification aerobic denitrification and phosphorus removal bacterial strain as claimed in claim 1, wherein *Pseudomonas mendocina* A4 is used in the treatment of nitrogen and phosphorus-containing wastewater, with a P/N ratio of 0.1 to 1.

7. The application of the salt-tolerant heterotrophic nitrification aerobic denitrification and phosphorus removal bacterial strain as claimed in claim 1, wherein *Pseudomonas mendocina* A4 is used in the treatment of nitrogen and phosphorus-containing wastewater, with a pH value of 5 to 9.

8. The application of the salt-tolerant heterotrophic nitrification aerobic denitrification and phosphorus removal bacterial strain as claimed in claim 1, wherein *Pseudomonas mendocina* A4 is used in the treatment of nitrogen and phosphorus-containing wastewater, at a temperature of 25° C. to 40° C.

9. The application of the salt-tolerant heterotrophic nitrification aerobic denitrification and phosphorus removal bacterial strain as claimed in claim 1, wherein a salinity of the wastewater is 0.5% to 15%.

\* \* \* \* \*